W. P. Wage,
Appr for Turning on Gas.
No 71,927.   Patented Dec. 10, 1867.

Witnesses
J. A. Knagg
Geo M Hopkins

Inventor
W. P. Wage

United States Patent Office.

W. P. WAGE, OF BARRE CENTRE, NEW YORK, ASSIGNOR TO HIMSELF AND M. CLARK, OF SAME PLACE.

Letters Patent No. 71,927, dated December 10, 1867.

IMPROVEMENT IN APPARATUS FOR TURNING ON GAS.

The Schedule referred to in these Letters Patent and making part of the same.

TO ALL WHOM IT MAY CONCERN:

Be it known that I, W. P. WAGE, of Barre Centre, in the county of Orleans, and State of New York, have invented a new and useful Improvement in Apparatus for Turning on Gas for illuminating purposes; and I do hereby declare that the following is a full, clear, and exact description of the construction and operation of the same, reference being had to the accompanying drawings making a part of this specification, in which—

Figure 1:
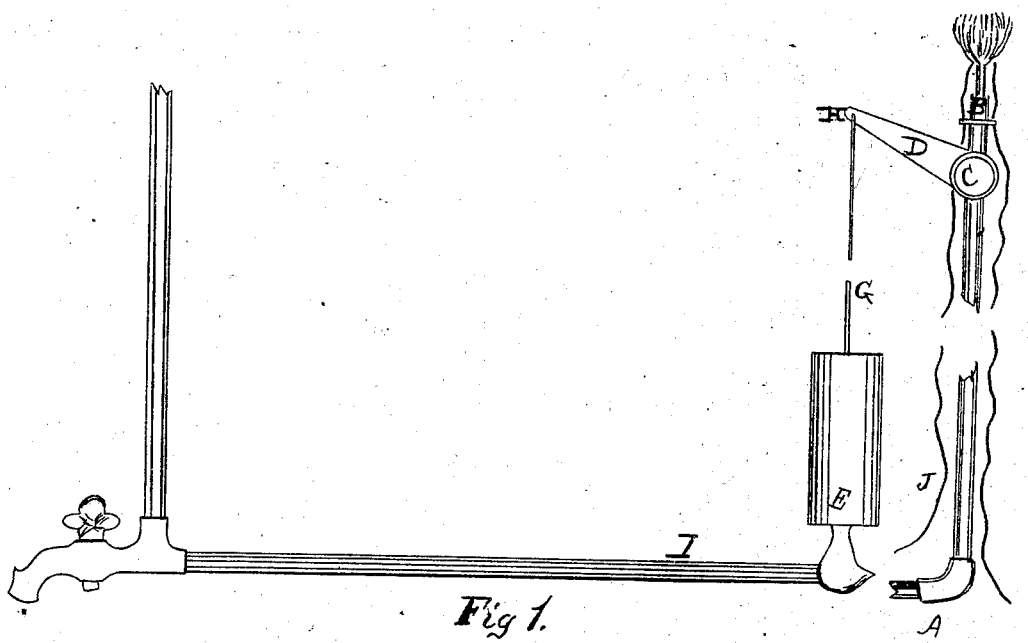
Figure 1 is a side elevation.
Figure 2:
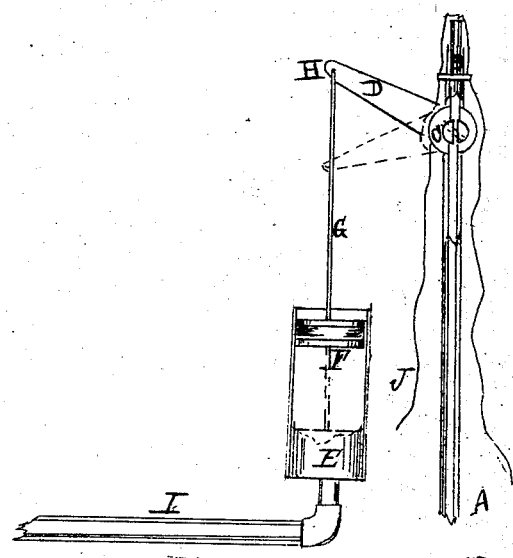
Figure 2 shows the piston F, and the manner in which it is connected with the lever D.

In fig. 1, A represents the gas-pipe which leads to the burner B. The stop-cock C, which is placed below the burner, is of the ordinary construction, except that the lever D, which operates it, swings a little above the centre of the stop-cock when it is open, and a little below the centre when the stop-cock is closed, as shown by the red lines in fig. 2. E represents a cylinder, in which is placed the piston F, to which is attached the rod G. This rod is jointed to the lever D at H. I is a pipe, opening into the bottom of the cylinder E. J represent an insulated wire, separated at the top of the burner B, and connected by a coil of small platinum wire. The cylinder E and the pipe I may be placed under ground, or in any convenient place.

The manner in which the gas is turned on and off is as follows: Water, air, or any convenient fluid or liquid is forced through the pipe I, and exerts a pressure on the piston F, which forces it upward, raising the lever D, which opens the stop-cock C. At the same time the wire J is connected with a strong galvanic battery, the current from which heats the platinum coil sufficiently hot to ignite the gas. When it is desired to turn off the gas, the water or air is exhausted from the pipe and cylinder E, when the atmosphere forces the piston down, closing the stop-cock, as shown by the red lines in fig. 2.

What I claim as new, and desire to secure by Letters Patent, is—

1. I claim the cylinder E, and the piston F, in combination with the lever D, or their equivalent, operated by the means and in the manner and for the purpose specified.

2. I claim lighting gas by electricity, in combination with the apparatus above described for turning on gas, as shown and described.

The above specification of my invention signed by me, this 7th day of May, 1867.

W. P. WAGE.

Witnesses:
J. A. KNAGG,
GEO. M. HOPKINS.